United States Patent
Peters et al.

(10) Patent No.: US 6,962,967 B2
(45) Date of Patent: Nov. 8, 2005

(54) METHOD OF PURIFYING POLYETHER POLYOLS OF NON-VOLATILE IMPURITIES

(75) Inventors: David D. Peters, Wyandotte, MI (US); Jon S. Speier, Baton Rouge, LA (US); Alexander Gershanovich, Oak Park, MI (US)

(73) Assignee: BASF Corporation, Florham Park, NJ (US)

( * ) Notice: Subject to any disclaimer, the term of this patent is extended or adjusted under 35 U.S.C. 154(b) by 51 days.

(21) Appl. No.: 10/813,725

(22) Filed: Mar. 31, 2004

(65) Prior Publication Data

US 2005/0222380 A1    Oct. 6, 2005

(51) Int. Cl.$^7$ ................................. C08F 6/00
(52) U.S. Cl. .................. 528/480; 203/14; 203/33; 203/36; 549/542
(58) Field of Search ............... 203/14, 33, 36; 549/542; 528/480

(56) References Cited

U.S. PATENT DOCUMENTS

| | | |
|---|---|---|
| 4,692,535 A | 9/1987 | Larson et al. |
| 5,160,587 A | 11/1992 | Marquis et al. |
| 5,235,075 A | 8/1993 | Bachman et al. |
| 5,352,807 A * | 10/1994 | Shih .......................... 549/542 |
| 5,489,366 A * | 2/1996 | Jongenburger ............... 203/14 |

FOREIGN PATENT DOCUMENTS

WO    WO 99/05199    2/1999

* cited by examiner

*Primary Examiner*—Terressa Boykin
(74) *Attorney, Agent, or Firm*—Fernando A. Borrego; Howard & Howard Atty

(57) ABSTRACT

The subject invention provides polyurethane foam and a method of purifying polyether polyols of non-volatile impurities for use in forming the polyurethane foam. The method includes the step of providing a crude polyether polyol having a non-volatile impurity present therein. The crude polyether polyol is contacted with an adsorbent selected from at least one of activated carbon, diatomaceous earth, charcoal, attapulgite, and clay to remove the impurity and filtered to form a purified polyether polyol. The filtering of the crude polyether polyol is carried out through a filter media that is used both in a pre-filtering step prior to adding the adsorbent and the filtering step to remove the adsorbent to reduce losses of the purified polyether polyol because of its high viscosity. The purified polyether polyol is then used to form a polyurethane foam having improved stability.

24 Claims, 9 Drawing Sheets

METHOD OF PURIFYING POLYETHER POLYOLS OF NON-VOLATILE IMPURITIES

BACKGROUND OF THE INVENTION

1) Field of the Invention

The subject invention relates to a method of purifying polyether polyols of non-volatile impurities.

2) Description of Related Art

Propylene oxide is a valuable precursor for the preparation of polyether polyols, which are employable in the production of polyurethane foams by reaction with an isocyanate. In general, commercially available propylene oxide for this purpose is of high purity, substantially all impurities having been removed prior to commercial availability by subjecting the propylene oxide product to various purification techniques involving distillation and/or separation from other components produced in its preparatory reaction or introduced in the purification of the propylene oxide product itself.

Techniques disclosed in the related art are extensive to put the propylene oxide in this commercially acceptable form. Most of these processes include distillation, fractionation, or separation, of propylene oxide in the presence of a hydrocarbon. Although a number of techniques, employed alone or in combination, have been successful in the production of commercially acceptable propylene oxide products, it was noted that certain polyurethane foams based on polyether polyols derived from such commercially available propylene oxide compositions would sometimes collapse even though the raw materials employed in the production of such polyurethane foam product, including intermediates therefore, would meet acceptable specifications.

The foam collapse was attributable to the presence of certain nonvolatile impurities present in the propylene oxide starting material employed in the preparation of the polyether polyol. Hence, even after the obtaining propylene oxide which meets commercially accepted specifications, the ultimate commercial acceptability of the propylene oxide was unpredictable due to the presence of these nonvolatile impurities which led to unacceptable polyurethane foam products exhibiting unstable foam rise, foam collapse, and/or substantial internal blow holes. This is attributed to the nonvolatile impurity, namely, poly(propylene oxide) (PPO), which has a molecular weight of at least 50,000. This impurity can make the propylene oxide unsuitable for making polyether polyols to be used with an isocyanate in the manufacture of acceptable polyurethane foams in certain formulations.

The purification process is typically followed by prompt conversion of the propylene oxide (PO) into the desired polyether polyols. However, prior to conversion, the PO can be shipped or stored in a vessel, which is made of conventional carbon steel. Conventional carbon steels can catalyze, over a period of time and at a given temperature, the formation of the undesired high molecular weight PPO impurity.

These commercially available propylene oxide products produce polyether polyols that yield unstable polyurethane foams having blow holes and/or low foam rise, even though conventional analysis of such polyether polyol products has failed to reveal the presence of contaminants that would be indicative of poor quality foam products. It has been determined that polyether polyols made from propylene oxide having reduced levels of the high molecular weight PPO impurity produced polyurethane foams with improved foam rise and with fewer blow hole formation.

Therefore, processes were developed for the purification and/or separation of propylene oxide even after being in an acceptable commercial state. U.S. Pat. No. 4,692,535 discloses a processes starting with the propylene oxide product suitable as an intermediate in the production of polyether polyols for forming polyurethane foam. The PPO was substantially removed from an otherwise commercially acceptable propylene oxide, prior to forming the polyether polyol for use in forming the polyurethane foam.

The '535 patent discloses filtering or percolating the PO through a fixed bed of an adsorbent material. The adsorbent materials included activated carbon, charcoal and attapulgite, either in granular or powdered forms. The quantities of adsorbent to be used per unit volume of PO to be treated are estimated at from about 0.001 to about 0.01 grams or more of solid adsorbent per gram of propylene oxide, with contact times ranging from about 1 to about 15 minutes, temperatures of from about 10 to about 100° C. and pressures ranging from atmospheric to super-atmospheric.

Another process was described in U.S. Pat. No. 5,235,075, to purify propylene oxide containing an unacceptable quantity of PPO. The process comprises contacting the propylene oxide with a diatomaceous earth for a time and under conditions sufficient to reduce the amount of contaminant to acceptable levels. Again, the purification was of the propylene oxide itself and not of a formed polyether polyol.

Accordingly, it would be advantageous to provide a method for purifying a polyether polyol of non-volatile impurities after the polyether polyol has been formed. While the prior art purifies the propylene oxide prior to forming the polyether polyol, the propylene oxide may still be contaminated before incorporation into the polyether polyol. Therefore, if the polyether polyol was purified, instead of the starting components, there would be a less likelihood of contamination leading to unstable foam products. Further, it would be advantageous to provide a method of purifying the polyether polyol without suffering large material losses during the purification and filtering thereof. And given that only certain foam formulations of given polyether polyol products are substantially influenced by the presence of PPO, a system that could be utilized on an as needed basis would also be advantageous.

BRIEF SUMMARY OF THE INVENTION

A method of purifying polyether polyols of non-volatile impurities is disclosed. The method includes the steps of providing a crude polyether polyol having present therein at least one non-volatile impurity with a number-average molecular weight of at least 25,000 and contacting the crude polyether polyol with an adsorbent. The contacting of the crude polyether polyol is continued for a time and under conditions sufficient to adsorb substantially all of the non-volatile impurities onto the adsorbent. Next, a purified polyether polyol is separated from the adsorbent. The purified polyether polyol can then be reacted with an isocyanate to form a polyurethane foam having improved stability.

The subject invention provides the method for purifying a polyether polyol of non-volatile impurities instead of purifying the starting components, such as propylene oxide. This helps to ensure that there is a less likelihood of contamination of the polyether polyol and will result in the polyurethane foam having increased stability. Further, the method according to the subject invention purifies the polyether polyol without suffering large material losses during the purification and filtering thereof and allows for the purification of polyether polyols on an as needed basis depending on the formulation requirements and/or demonstrated performance.

BRIEF DESCRIPTION OF THE SEVERAL VIEWS OF THE DRAWING

Other advantages of the present invention will be readily appreciated, as the same becomes better understood by reference to the following detailed description when considered in connection with the accompanying drawings wherein.

DETAILED DESCRIPTION OF THE INVENTION

Figure 1:
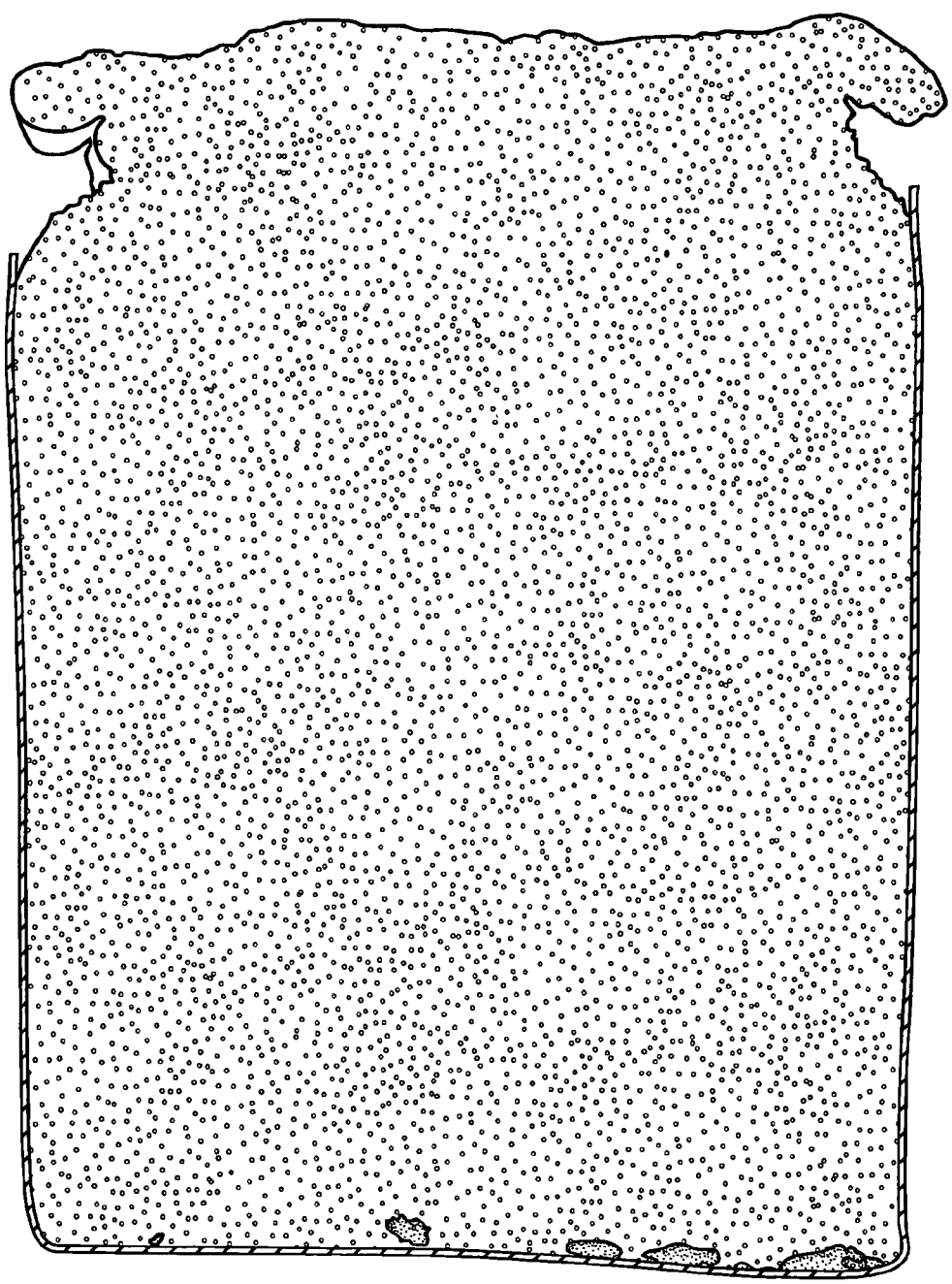
FIG. 1 is a cross-sectional schematic view of a polyurethane foam formed from an uncontaminated polyether polyol in an open-topped container.

The subject invention provides a polyurethane foam and a method of purifying polyether polyols of non-volatile impurities for use in forming the polyurethane foam. The method includes the step of providing a crude polyether polyol. The term crude polyether polyol refers generally to a polyether polyol that has the non-volatile impurity present therein. The crude polyether polyol may or may not have been formed from the commercially acceptable propylene oxide (PO). For the subject invention, the non-volatile impurity has been added to a polyether polyol formed from the commercially acceptable PO to demonstrate the negative effects of the impurity and to demonstrate the success of stabilizing the polyurethane foam. It is to be appreciated that the subject invention can be practiced with commercially acceptable PO that has not been purposefully contaminated, but has become contaminated since it was purified during shipment or storage. The subject invention has purposefully contaminated the polyether polyol as an illustrative example and is not meant to be limiting.

The PO used as the starting material of the present invention may be obtained by any of the commercially available routes presently practiced for the production of PO. Hence, the PO may be obtained by the classic chlorohydrin route involving reaction of chlorine, propylene and water to form propylene chlorohydrin, which is then dehydrochlorinated with calcium hydroxide to form PO, or alternatively, may be obtained by reaction of propylene with an organic hydroperoxide in the presence of a specified metal catalyst. The PO obtained by either of the aforementioned commercial methods may be first subjected to conventional purification and recovery techniques involving the removal of unreacted reactants, by-products and other treating agents to thereby produce what has been heretofore referred to as propylene oxide meeting acceptable commercial specifications.

It has been found that PO resulting from any of the purification methods, may be inherently contaminated with, or may thereafter, during transport or upon storage, for example, upon contact with a metal, e.g. carbon steel, become contaminated with the impurity. The non-volatile impurity has a number-average molecular weight of at least about 25,000 Daltons. One particularly detrimental impurity is polypropylene oxide (PPO) with a number-average molecular weight of at least 45,000 Daltons, preferably at least about 50,000 Daltons, and generally greater than about 100,000 Daltons. Without being bound to a particular theory, it is believed that this contaminant interferes with the production of stable polyurethane foam based on polyether polyols derived from such PPO contaminated compositions.

It has also surprisingly been determined that another detrimental impurity may be soluble forms of polyethylene oxide (PEO). This is surprising because it is generally held that PEO of any appreciable molecular weight is insoluble in the unreacted ethylene oxide (EO), as well as in the finished polyether polyol be they PO/EO random or blocked co-polymer and can typically be separated using standard techniques. However, it was discovered that polyether polyol comprised of a mixture of EO and PO as a block or random co-polymer contained significantly higher levels of high molecular weight impurity. It is to be appreciated that the impurity may include a mixture of the high molecular weight PPO and PEO. However, for clarity, the subject invention will be described as addressing PPO, without intending to be limited thereto.

A polyether polyol, known to contain PPO due to intentional introduction for reason of experimental evaluations or suspected to contain PPO evidenced by foam instability is contacted with an adsorbent for a time and under conditions sufficient to adsorb substantially all of the non-volatile impurities onto the adsorbent. The amount of adsorbent used is 0.1 to 5 parts by weight based on 100 parts by weight of the crude polyether polyol, preferably from 0.5 to 3, and most preferably from 1 to 1.8. The quantity of solid adsorbent employed per unit volume of polyether polyol to be treated will vary not only with the efficiency of the solid adsorbent to absorb impurities, but also with the amount of impurities present at the time of contact, as well as the desired contact time and recover efficiency. When the amount of adsorbent used in treatment is greater than 5% by weight, more material losses occurs albeit it potentially removes the impurity more rapidly. Therefore, one skilled in the art may elect to use greater than 5% by weight of adsorbent.

The crude polyether polyol is contacted with the adsorbent by mixing the crude polyether polyol with the adsorbent for a period of time of from 5 to 120 minutes, preferably from 30 to 90, and most preferably from 45 to 75. The treatment with the adsorbent may be effected at temperatures in the range of from about 10° C. to about 100° C. In the subject invention, it is to be appreciated that those skilled in the art would recognize that the adsorbent could be used as a bed instead of as a form of a slurry. The treatment time allows the impurity to exchange, adhere, absorb or adsorb to the adsorbent. Further, the adsorbent may be used in a column assembly as with chromatography.

The adsorbent is selected from at least one of activated carbon, diatomaceous earth, charcoal, attapulgite, and clay. It is to be appreciated that the adsorbent may also be natural and/or synthetic silicates. Pursuant to the subject invention, it has been discovered that the crude polyether polyols may be purified with these adsorbents, thereby, reducing blow-hole formation and having desired high rise, without losing large amount of the purified polyether polyol during filtration. Exceptionally useful activated carbons or charcoals include those obtained from lignite, gas black, coconut, bagasse, wood, sawdust, peat, pulp-mill waste, blood, bone, etc. Specific activated carbons include Calgon Corporation granular carbons, NORIT granular activated carbons, products of Central Scientific Company, Nuchar activated carbons, products of West Virginia Pulp and Paper Company, and products of Darco Division, ICI AMERICAS, Inc. Illustrative commercially available carbons include Type CAL granular carbon (Calgon Corporation) and NORIT R 0.8 granular activated carbon (NORIT Corporation).

Attapulgite adsorbents employable in the purification process of the present invention are available from Engelhard Minerals and Chemicals Corporation. The grades of Attapulgus Clay normally recommended for contact purification are 100/UP Mesh RVM and 200/UP Mesh RVM. The finer grade 200/UP RVM is normally used unless higher rates of filtration are required, in which case 100/UP RVM is used.

Another suitable absorbent is diatomaceous earth, which is known to those skilled in the art to be formed from a sedimentary rock of marine or lacustrine deposition, and consists mainly of accumulated shells or frustules of hydrous silica secreted by diatoms (microscopic, one-celled, flowerless plants of the class Bacillarieae). However, in chemical terms, diatomaceous earth is primarily formed of silicon dioxide, albeit in a different physical structure than typically encountered. Impurities typically include other aquatic fossils, sand, clay, volcanic ash, calcium carbonate, magnesium carbonate and silicates, soluble salts and organic matter, while a typical spectrographic analysis on a dry basis may show $SiO_2$, $CaO$, $MgO$, $Al_2O_3$, $Fe_2O_3$, $Na_2O$, $V_2O_5$, and $TiO_2$. In physical terms, most diatomaceous earths are powders, having mean particle diameters ranging from 20 to 0.75 micrometers, although aggregates can be obtained having 1.27 centimeter diameters down to fine powders. One example of a freshwater-origin diatomaceous earth is sold commercially as "ODW" grade diatomaceous earth (Oil-Dri Corporation of America).

After mixing, the purified polyether polyol is separated from the adsorbent. In order to separate the purified polyether polyol from the adsorbent, a filtering method is provided to remove the adsorbent, with the adsorbed non-volatile impurity, from the purified polyether polyol. The filter method employed may be selected from the commercially available filtering technologies, such as a Funda Type pressure filter from Steri Technologies, Inc. It is conceivable to someone skilled in the art that any number of filtering techniques and methods are acceptable, including but no limited to a primary filtering operation, to be followed by a finish filtering stage to remove the extremely fine particles.

The filtering of the mixture is continued to substantially remove the adsorbent and the non-volatile impurity. Preferably, the filtering of the purified polyether polyol through the filter media is conducted under a pressure of 10 to 50 psig, preferably from 10 to 25, and more preferably from 10 to 15. The step of filtering the purified polyether polyol is also continued for a period of time of from 1 to 5 hours to substantially remove the adsorbent and the non-volatile impurity.

Those skilled in the art, prior to the subject invention, may not have undertaken the purification of the completed polyether polyol, presented in the subject invention because of the potential losses of the purified polyether polyol and it was not advantageous. However, it has been surprisingly discovered that the larges losses of the purified polyether polyol do not occur when the filter media is reused. To prevent large losses of the purified polyether polyol, the crude polyether polyol is pre-filtered through the filter media prior to contacting the crude polyether polyol with the adsorbent. As is standard practice for forming the polyether polyols, additional components are used, such as MAGNESOL® and perlite, during the formation of the polyether polyols from the starting components. These additional components are filtered prior to adding the adsorbent through the filter media. The pre-filtering is preferably carried out under a pressure of 10 to 50 psig, preferably from 10 to 25, and more preferably from 10 to 15.

After completing the pre-filtering, the same filter media is used to filter the purified polyether polyol and the adsorbent with the adsorbed non-volatile impurity. By contacting the crude polyether polyol with the adsorbent through the same filter media, the purified polyether polyol does not sustain large loses, as would be expected, even though the viscosity of the crude polyether polyol is large.

The polyurethane foam is prepared by reacting the purified polyether polyol with at least one isocyanate in the typically accepted manner and under typical reaction conditions known to those skilled in the art. Generally, water and/or some other blowing agent is utilized along with other conventional materials, e.g., inorganic fillers, surfactants, catalysts, auxiliary blowing agents, and provide stable polyurethane foams exhibiting less sag, shrink and/or collapse and having substantially reduced blow-hole formation. The isocyanate may include aliphatic, alicyclic and aromatic isocyanates characterized by containing two or more isocyanate groups. Such isocyanates include the diisocyanates and higher functionality isocyanates, particularly the aromatic polyisocyanates. The polyisocyanate may be an isocyanate-terminated pre-polymer made by reacting, under standard conditions, an excess of a polyisocyanate with a polyol that on a polyisocyanate to polyol basis, may range from about 20:1 to 2:1.

Also illustrative of the isocyanates which may be employed are, for example: toluene-2,4- and 2,6-diisocyanates or mixtures thereof; diphenylmethane-4,4'-diisocyanate and diphenylmethane-2,4'-diisocyanate or mixtures of the same, the mixtures preferably containing about 10 parts by weight 2,4'- or higher, making them liquid at room temperature; polymethylene polyphenyl isocyanates; naphthalene-1,5-diisocyanate; 3,3'-dimethyl diphenylmethane-4,4'-diisocyanate; triphenyl-methane triisocyanate; hexamethylene diisocyanate; 3,3'-ditolylene-4,4'-diisocyanate; butylene 1,4-diisocyanate; octylene-1,8-diisocyanate; 4-chloro-1,3-phenylene diisocyanate; 1,4-, 1,3-, and 1,2-cyclohexylene diisocyanates.

The following examples illustrate the formation of the polyurethane foam, according to the subject invention and illustrating certain properties of the polyurethane foam, as presented herein, are intended to illustrate and not limit the invention.

EXAMPLES

In the following Control Example, Examples 1 and 2, and Comparative Examples 1 and 2, a polyurethane foam was formed. The foams were formed, in each example, from a polyether polyol A, PLURACOL® 1509 polyol, which is a sorbitol and a glycerine co-initiated polymer being all PO with EO cap and having OH no. of about 27.5 and a graft polyol B, PLURACOL® 2145 polyol, which is an acrylonitrile, styrene graft copolymer with 45% solids, both available from BASF Corp.

In Example 1 and Comparative Example 1, an impurity was added to the polyol A, while the polyol A of Control Example was not contaminated. Adding the impurity simulated contamination that would occur if the polyether polyol was formed from contaminated propylene oxide. To prepare the impurity containing polyether polyol A, a sample of non-volatile residue known to contain high molecular weight PPO isolated from a commercial sample of PO was dissolved into a solvent and added to a sample of the PLURACOL® 1509 polyol. The solvent introduced to the polyol sample with the PPO, was then removed under vacuum. Without being bound by theory, it is believed that the remaining components were the high-molecular weight impurity. This impurity was diluted with solvent to have a concentration of 7.3 milligrams (mg) of impurity per milliliter (ml) of solution. The solvent was tetrahydrofuran. Therefore, in 6 ml of solution, 43.8 mg of impurity would be present. To form the contaminated polyol A for Example 1 and Comparative Example 1, 1200 grams (g) of polyol A was spiked with 6 mL of contaminate having an impurity concentration of 7.3 mg/ml.

The following table listed the compositional breakdown used to form the foam for each of Examples and the resultant height and weight of the produced foam.

Products. The isocyanate is toluene diisocyanate (TDI), commercially available from BASF Corp.

Each of the examples was formed using the parts by weight breakdown, listed in Table 1, under the composition heading. In the Control Example, the total amount of the mix was 690 g. Of the 690 g, the resin was 424 grams and the isocyanate was 265.9 g (at an isocyanate index of 110). Polyol A was used in an amount of 304.8 g and polyol B was used in an amount of 87.1 g. The surfactant was used in an amount of 3.92 g, while the water and catalyst were used as a mixture of 28.33 g. Polyol A used in the Control Example was not contaminated with an impurity prior to forming the polyurethane foam and was known to produce a stable polyurethane foam.

For Example 1 and Comparative Example 1, the total amount of the mix was 690 g. Of the 690 g, the resin was 424 grams and the isocyanate was 265.9 g (at an isocyanate index of 110). Polyol A was used in an amount of 304.8 g and polyol B was used in an amount of 87.1 g. The surfactant was used in an amount of 3.92 g, while the water and catalysts were used as a mixture of 28.33 g. However, for each of these examples, polyol A was contaminated as described above prior to forming the polyurethane foam.

In Example 1, the polyether polyol A was treated with activated carbon to adsorb substantially all of the impurities onto the adsorbent before forming the polyurethane foam. Specifically, prior to treating with activated carbon, a 1200 g sample of the contaminated polyol A was treated with magnesol, perlite, and water, as known to those skilled in the art for preparing polyols, at 95° C. for three hours. The magnesol was used in an amount of 1.5 parts by weight based on 100 parts by weight of polyol A and the perlite was used at 0.2 parts by weight based on 100 parts by weight of polyol A. The water was used at 3.0 parts by weight based

TABLE 1

Formulation for Polyurethane Foam

|  | Control | Comparative Example 1 | Example 1 | Comparative Example 2 | Example 2 |
|---|---|---|---|---|---|
| Polyol Characteristics |  |  |  |  |  |
| Polyol A - Hydroxyl Number | 32 | 32 | 32 | 32 | 32 |
| Polyol B - Hydroxyl Number | 19 | 19 | 19 | 19 | 19 |
| % solids, Polyol B | 45 | 45 | 45 | 45 | 45 |
| % Resin solids, desired | 10 | 10 | 10 | 15 | 15 |
| Composition, pbw |  |  |  |  |  |
| Polyol A | 77.8 | 77.8 | 77.8 | 66.7 | 66.7 |
| Polyol B | 22.2 | 22.2 | 22.2 | 33.3 | 33.3 |
| Cross-linker | 1.4 | 1.4 | 1.4 | 1.4 | 1.4 |
| Water | 5.4 | 5.4 | 5.4 | 5.4 | 5.4 |
| Catalyst A | 0.08 | 0.08 | 0.08 | 0.08 | 0.08 |
| Catalyst B | 0.35 | 0.35 | 0.35 | 0.35 | 0.35 |
| Surfactant | 1 | 1 | 1 | 1 | 1 |
| Total Resin | 108.23 | 108.23 | 108.23 | 108.23 | 108.23 |
| Isocyanate 100 Index | 61.7 | 61.7 | 61.7 | 61.5 | 61.5 |
| Isocyanate 110 Index | 67.9 | 67.9 | 67.9 | 67.6 | 67.6 |
| Free Rise Stability |  |  |  |  |  |
| Foam height, mm | 365 | 330 | 345 | 135 | 335 |
| Foam weight, grams | 560 | 552 | 557 | N/A | N/A |

The cross-linker is NIAX® DEOA-LF, commercially available from Union Carbide. Catalyst A is DABCO® BL-11, Catalyst B is DABCO® 33 LV, and the surfactant is DABCO® DC 5043, each commercially available from Air on 100 parts by weight of polyol A. Next, the crude polyol A was filtered through a standard paper filter for about 120 minutes under a vacuum of about 6–10 mm Hg to remove the MAGNESOL® and perlite and the water was stripped by known methods. The filter media formed a filter cake that was saved for additional filtering.

The polyol A was then treated with activated carbon, in an amount of 1.5 parts by weight based on 100 parts by weight of polyol A for about three hours. The polyol A was then filtered through the filter cake to remove the activated carbon for 120 minutes under a vacuum of about 6–10 mm Hg. The purified polyol A was then used to make the polyurethane foam.

For Comparative Example 1, a 400 g sample of the contaminated polyol A was treated with magnesol, perlite, and water, as known to those skilled in the art for treating polyols, at 95° C. for three hours. The magnesol was used in an amount of 1.5 parts by weight based on 100 parts by weight of polyol A and the perlite was used at 0.2 parts by weight based on 100 parts by weight of polyol A. The water was used at 3.0 parts by weight based on 100 parts by weight of polyol A. The polyol A was filtered through a standard paper filter for about 120 minutes under a vacuum of about 6–10 mm Hg to remove the MAGNESOL® and perlite. The crude polyol A was then used to make the polyurethane foam.

In Example 2 and Comparative Example 2, the polyol A was known to have a high-molecular weight impurity present therein and known to produce polyurethane foam that would collapse. In forming the polyurethane foam for these examples, the total amount of the mix was 690 g. Of the 690 g, the resin was 425 grams and the isocyanate was 265.3 g (at an isocyanate index of 110). Polyol A was used in an amount of 261.6 g and polyol B was used in an amount of 130.8 g. The surfactant was used in an amount of 3.92 g, while the water and catalyst were used as a mixture of 28.37 g.

In Example 2, the polyether polyol A was treated with diatomaceous earth to purify the polyol A. Prior to treating with diatomaceous earth, the polyol A was treated with magnesol, perlite, and water, as known to those skilled in the art for preparing polyols, at 95° C. for three hours. The magnesol was used in an amount of 1.5 parts by weight based on 100 parts by weight of polyol A and the perlite was used at 0.2 parts by weight based on 100 parts by weight of polyol A. The water was used at 3.0 parts by weight based on 100 parts by weight of polyol A. Next, the crude polyol A was filtered through a standard paper filter for about 120 minutes under a vacuum of about 6–10 mm Hg to remove the MAGNESOL® and perlite and the water was stripped by known methods. The filter media formed a filter cake that was saved for additional filtering.

The polyol A was then treated with diatomaceous earth in an amount of 1.5 parts by weight based on 100 parts by weight of polyol A for three hours. The polyol A was then filtered through the filter cake to remove the diatomaceous earth for 120 minutes under a vacuum of about 6–10 mm Hg. The purified polyol A was then used to make the polyurethane foam.

For Comparative Example 2, the polyether polyol A was not treated with diatomaceous earth. The polyol A was treated with magnesol, perlite, and water, as known to those skilled in the art for preparing polyols, at 95° C. for three hours. The magnesol was used in an amount of 1.5 parts by weight based on 100 parts by weight of polyol A and the perlite was used at 0.2 parts by weight based on 100 parts by weight of polyol A. The water was used at 3.0 parts by weight based on 100 parts by weight of polyol A. Next, the crude polyol A was filtered through a standard paper filter for about 120 minutes under a vacuum of about 6–10 mm Hg to remove the MAGNESOL® and perlite and the water was stripped by known methods. The crude polyol A was then used to make the polyurethane foam.

For each of the above Examples, the processing conditions were the same and were as follows. The temperature of the components was ambient temperature, 25° C. The mixer that was used was a Dayton variable speed DC motor mixer operated at 100% using a 3-inch German mix blade. The resin mix time was 45 seconds at full speed and was mixed in a 1-quart milk shake cup. The foam mix time was 6 seconds at 2400–3600 RPMs and was then transferred to a 5 gallon payliner bucket, the mix was poured for 12 seconds.

The Control Example produced polyurethane foam that is as a cross-sectional schematic view of the 5-gallon bucket shown in FIG. 1 (not to scale). In other words, an actual foam sample was prepared in accordance with the Control Example and FIG. 1 is an accurate representation thereof. The foam has a foam height of 385 mm and a foam weight of 560 g. The foam was substantially free of any internal voids, even though there was slight shear collapse along the bottom of the bucket. The surface of the polyurethane foam was smooth and exhibited good stability.

Figure 2:
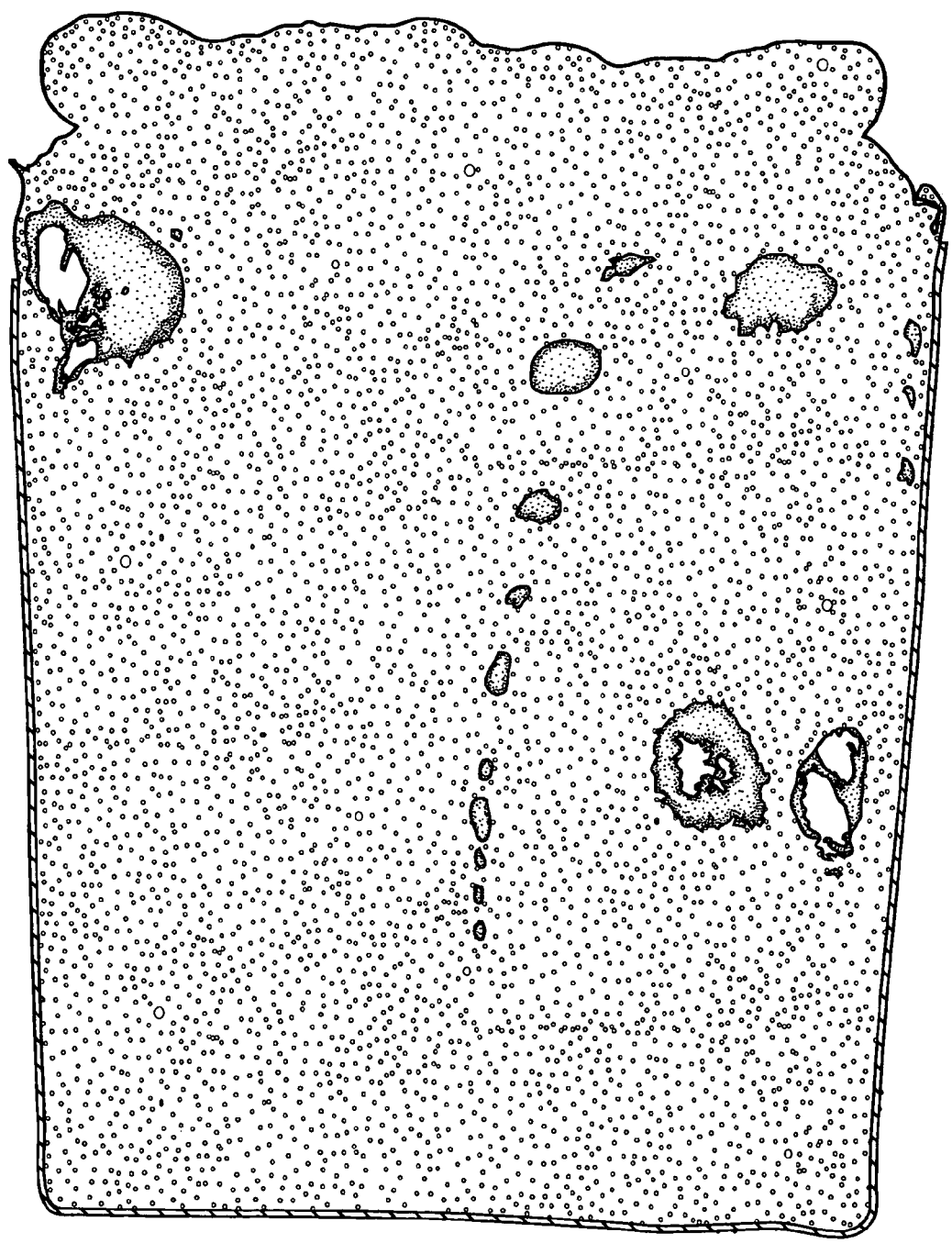
FIG. 2 is a cross-sectional schematic view of a polyurethane foam formed in Comparative Example 1 from a contaminated polyether polyol having an impurity present therein.
Figure 3:
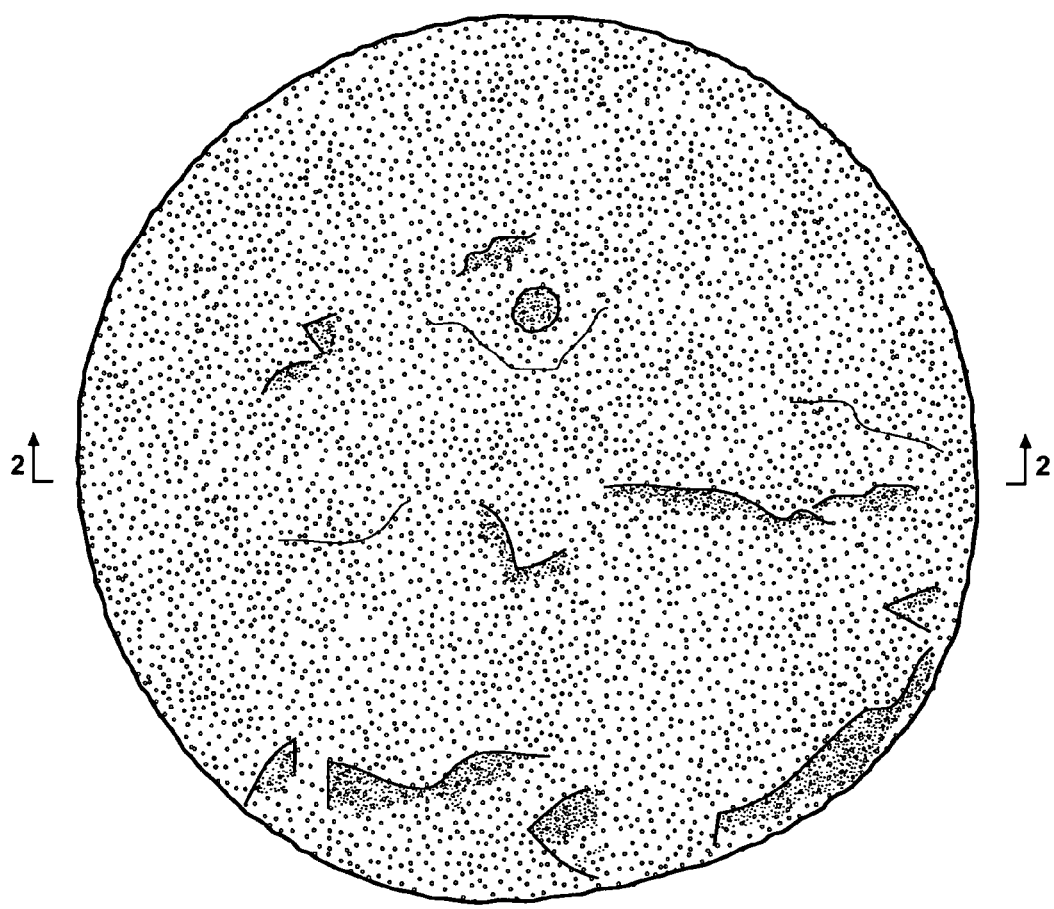
FIG. 3 is a top schematic view of the polyurethane foam formed in Comparative Example 1.

FIG. 2 illustrate a cross-sectional view of the polyurethane foam formed in Comparative Example 1 having the impurity present therein. FIG. 3 is a top view of the polyurethane foam formed in Comparative Example 1. In other words, an actual foam sample was prepared in accordance with the Comparative Example 1 and FIGS. 2 and 3 are an accurate representation thereof. The foam has a foam height of 330 mm and a foam weight of 552 g. Relative to the Control Example, the foam height has decreased by about 9.5%. The foam has many internal voids and has a lot of shear collapse along the sides of the bucket. Referring to FIG. 3, the surface of the polyurethane foam exhibits instability that is indicative of subsurface voids.

Figure 4:
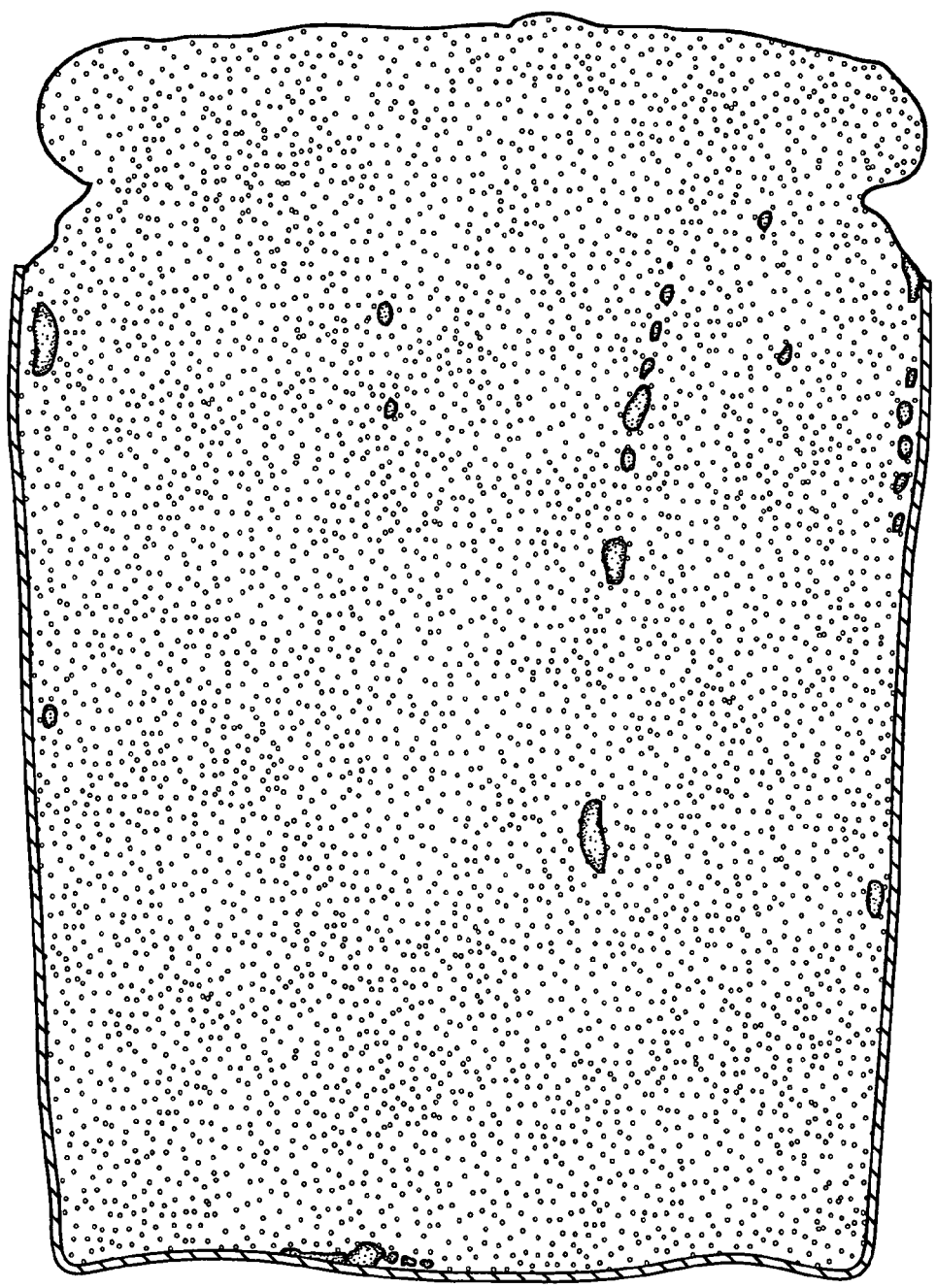
FIG. 4 is a cross-sectional schematic view of a polyurethane foam formed in Example 1 from a purified polyether polyol.
Figure 5:
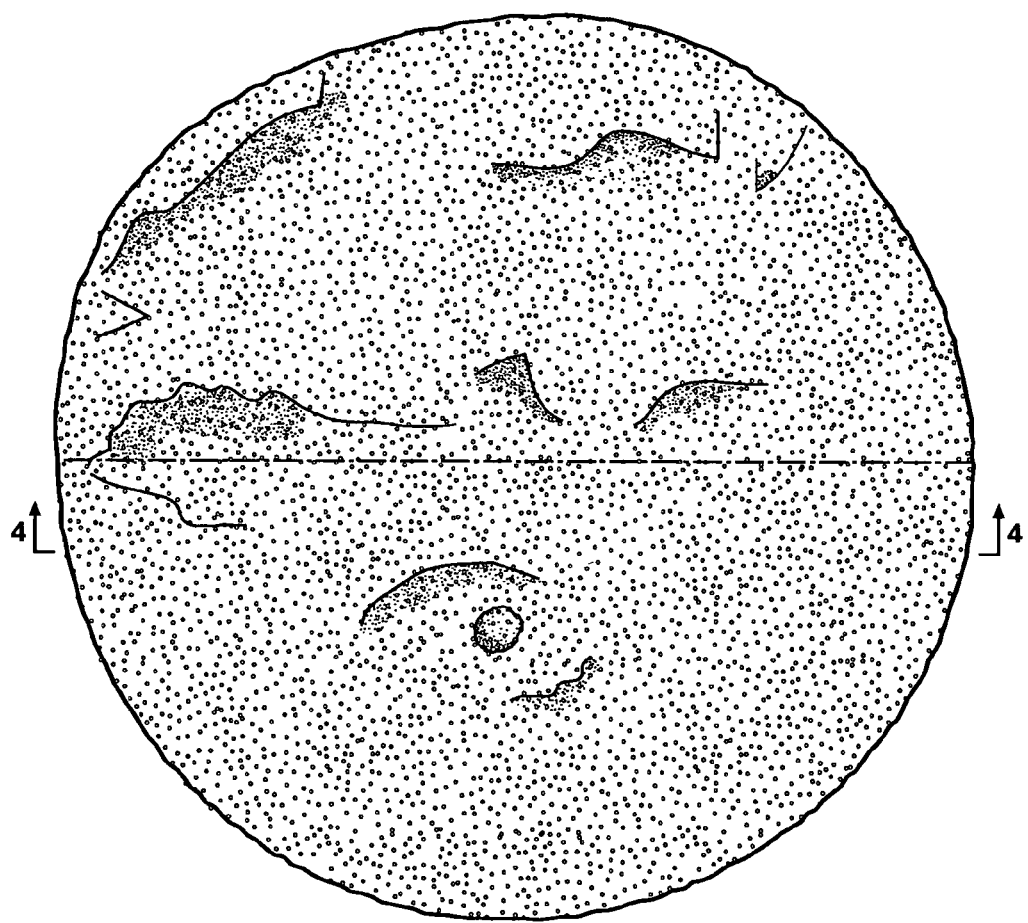
FIG. 5 is a top schematic view of the polyurethane foam formed in Example 1.

FIG. 4 illustrate a cross-sectional view of the polyurethane foam formed in Example 1 having the impurity filtered from the polyol A with activated carbon. FIG. 5 is a top view of the polyurethane foam formed in Example 1. In other words, an actual foam sample was prepared in accordance with Example 1 and FIGS. 4 and 5 are an accurate representation thereof. The foam has a foam height of 345 mm and a foam weight of 557 g. Relative to the Control Example, the foam height has only decreased about 5.5% and the weight has only decreased by 0.5% in Example 1. The foam produced in Example 1 is better than the foam produced in Comparative Example 1 due to the impurity being removed from the polyol A. The foam has fewer internal voids than the foam produced in Comparative Example 1. Referring to FIG. 5, the surface of the polyurethane foam is smoother, which is indicative of fewer subsurface voids and a more stable foam.

Figure 6:
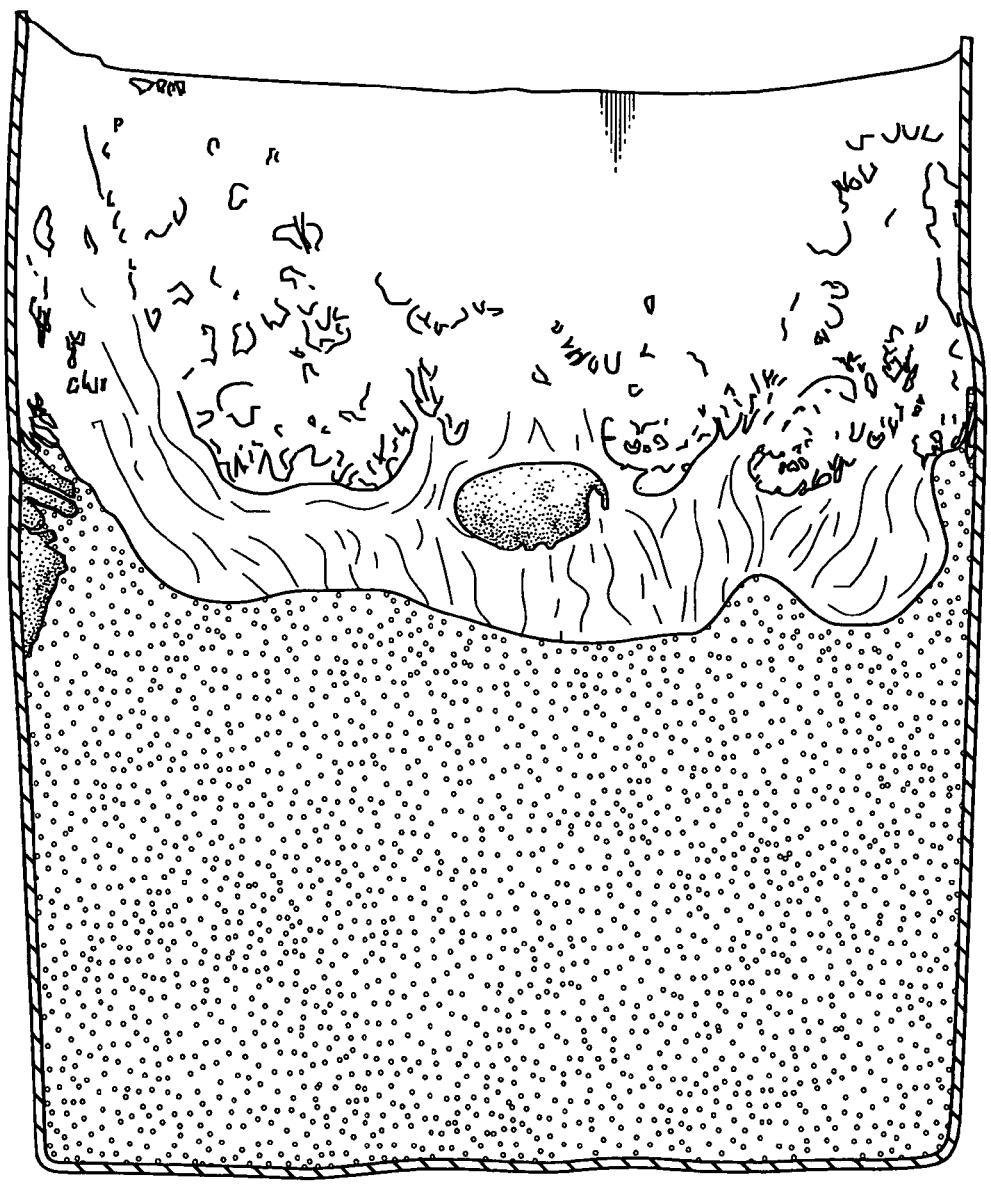
FIG. 6 is a cross-sectional schematic view of the polyurethane foam formed in Comparative Example 2 with a known contaminated polyether polyol having a impurity present therein.
Figure 7:
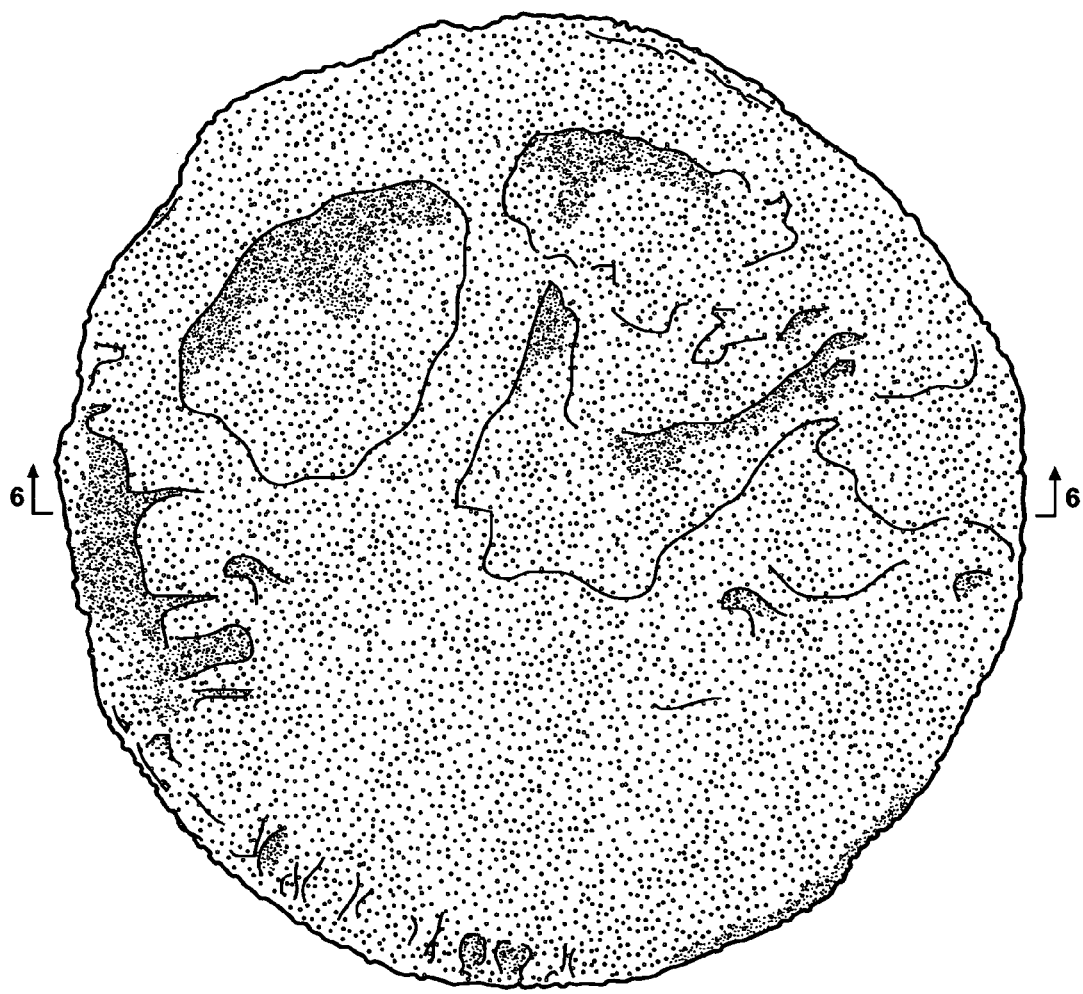
FIG. 7 is a top schematic view of the polyurethane foam formed in Comparative Example 2.

FIG. 6 illustrate a cross-sectional view of the polyurethane foam formed in Comparative Example 2 that is formed from a known contaminated polyol A. FIG. 7 is a top view of the polyurethane foam formed in Comparative Example 2. In other words, an actual foam sample was prepared in accordance with Comparative Example 2 and FIGS. 6 and 7 are an accurate representation thereof. The foam has a foam height of only 135 mm, because the foam collapsed due to the presence of the impurity. Referring to FIG. 7, the surface of the polyurethane foam exhibits large subsurface and surface voids.

Figure 8:
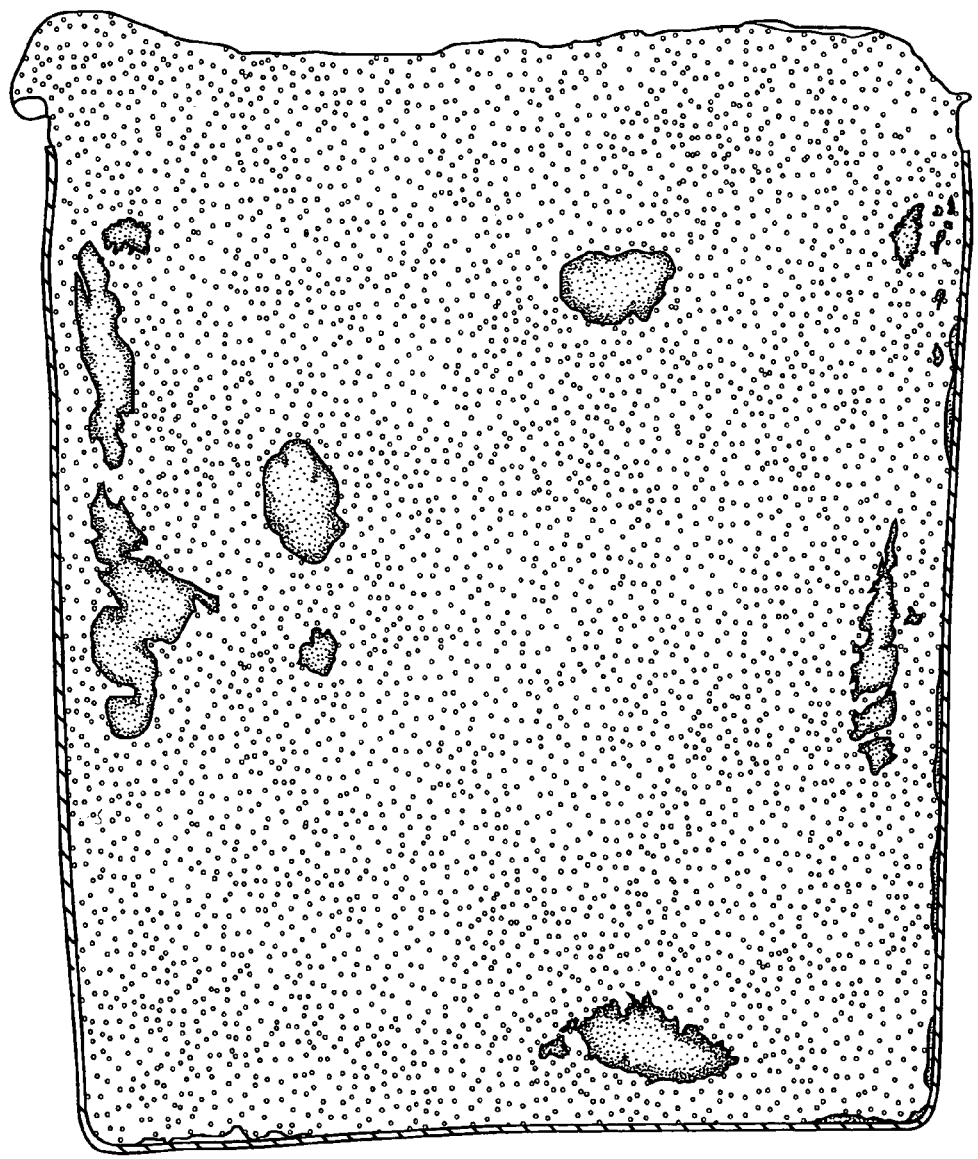
FIG. 8 is a cross-sectional schematic view of the polyurethane foam formed in Example 2 with a purified polyether polyol.
Figure 9:
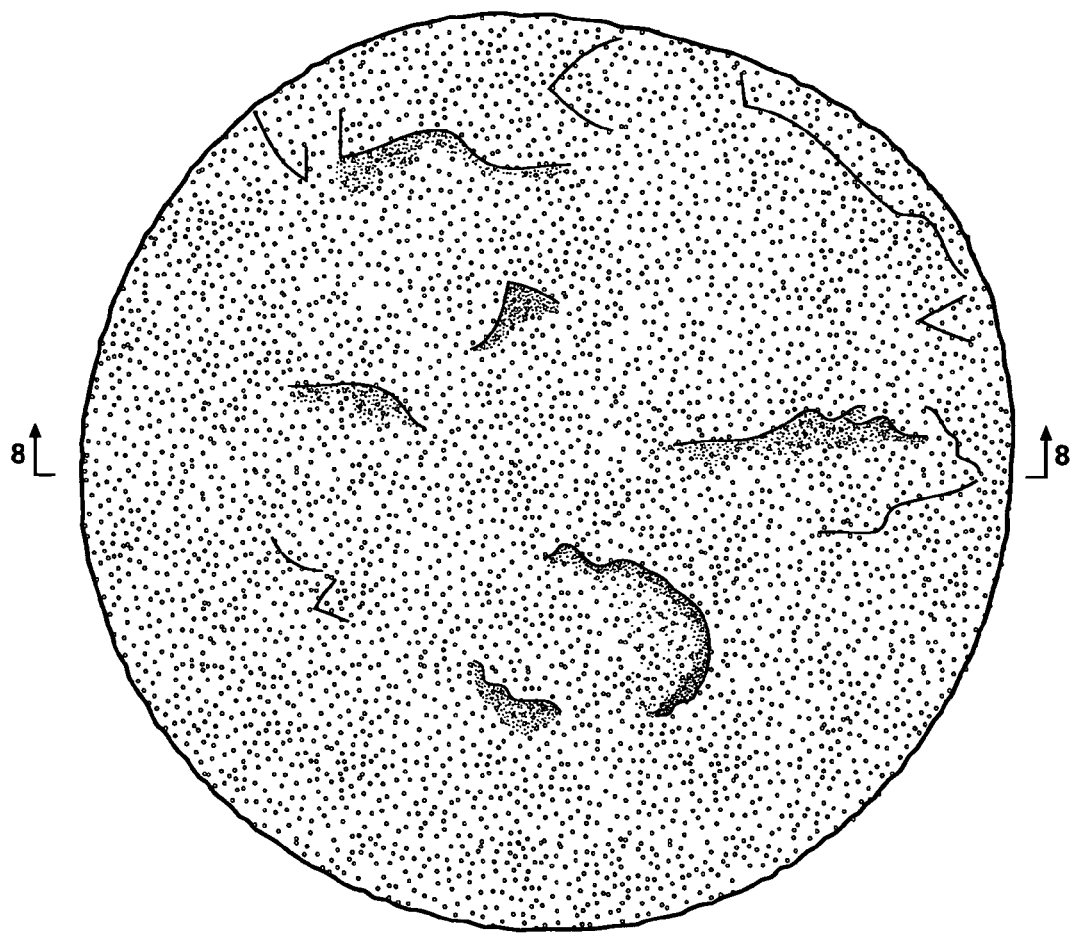
FIG. 9 is a top schematic view of the polyurethane foam formed in Example 2.

FIG. 8 illustrates a cross-sectional view of the polyurethane foam formed in Example 2 having the impurity filtered from the polyol A. FIG. 9 is a top view of the polyurethane foam formed in Example 2. In other words, an actual foam sample was prepared in accordance with Examples and FIGS. 8 and 9 are an accurate representation thereof. The foam has a foam height of 335 mm. Relative to Comparative Example 2, the foam height has improved about 148% due to the impurity being removed from the polyol A with diatomaceous earth. While the foam does have some internal voids, it is much improved relative to the foam produced in Comparative Example 2. Referring to FIG. 9, the surface of the polyurethane foam is smoother, which is indicative of fewer subsurface voids and a more stable foam.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of purifying polyether polyols of non-volatile impurities, said method comprising:
   providing a crude polyether polyol comprising a reaction product of an initiator and at least one of propylene oxide and ethylene oxide and having present therein at least one non-volatile impurity with a number-average molecular weight of at least 25,000 Daltons;
   contacting the crude polyether polyol with an adsorbent for a time and under conditions sufficient to adsorb substantially all of the non-volatile impurities onto the adsorbent; and
   separating a purified polyether polyol from the adsorbent.

2. The method as set forth in claim 1 further including the step of selecting the adsorbent from at least one of activated carbon, diatomaceous earth, charcoal, attapulgite, and clay.

3. The method as set forth in claim 1 wherein the step of separating the purified polyether polyol is further defined as providing a filter media to filter the adsorbent with the adsorbed non-volatile impurity from the purified polyether polyol.

4. The method as set forth in claim 3 further including the step of filtering the mixture of the purified polyether polyol and the adsorbent with the adsorbed non-volatile impurity through the filter media to substantially remove the adsorbent and the non-volatile impurity.

5. The method as set forth in claim 4 wherein the step of filtering the purified polyether polyol is further defined as filtering the polyether polyol through the filter media under a pressure of 10 to 50 psig.

6. The method as set forth in claim 4 wherein the step of filtering the purified polyether polyol is continued for a period of time of from 1 to 5 hours to substantially remove the adsorbent and the non-volatile impurity.

7. The method as set forth in claim 3 further including the step of pre-filtering the crude polyether polyol through the filter media prior to contacting the crude polyether polyol with the adsorbent.

8. The method as set forth in claim 7 wherein the step of pre-filtering the crude polyether polyol is carried out under a pressure of 10 to 50 psig.

9. The method as set forth in claim 7 further including the step of filtering the purified polyether polyol and the adsorbent with the adsorbed non-volatile impurity after contacting the crude polyether polyol with the adsorbent through the same filter media used to pre-filter the crude polyether polyol.

10. The method as set forth in claim 1 wherein the step of contacting the crude polyether polyol with the adsorbent is further defined as mixing the crude polyether polyol with the adsorbent.

11. The method as set forth in claim 10 wherein the step of mixing the crude polyether polyol with the adsorbent is carried out for a period of time of from 5 to 120 minutes.

12. The method as set forth in claim 1 wherein the step of providing the crude polyether polyol having the non-volatile impurity is further defined as providing the crude polyether polyol having present therein at least one of polypropylene oxide and polyethylene oxide with a number-average molecular weight of at least 45,000 Daltons.

13. A method of forming a polyurethane foam, said method comprising the steps of:
   contacting a crude polyether polyol comprising a reaction product of an initiator and at least one of propylene oxide and ethylene oxide and having present therein a non-volatile impurity with a number-average molecular weight of at least 25,000 Daltons with an adsorbent for a time and under conditions sufficient to absorb substantially all of the non-volatile impurity onto the absorbent;
   separating a purified polyether polyol from the adsorbent after contacting the crude polyether polyol with the adsorbent; and
   reacting the purified polyether polyol with at least one isocyanate to produce a polyurethane foam having increased stability compared to a foam prepared using the crude polyether polyol.

14. The method as set forth in claim 13 further including the step of selecting the adsorbent from at least one of activated carbon, diatomaceous earth, charcoal, attapulgite, and clay.

15. The method as set forth in claim 13 wherein the step of selecting the purified polyether polyol is further defined as providing a filter media to filter the adsorbent with adsorbed non-volatile impurity from the purified polyether polyol.

16. The method as set forth in claim 15 further including the step of filtering the purified polyether polyol and the adsorbent with adsorbed non-volatile impurity through the filter media to substantially remove the adsorbent and the non-volatile impurity.

17. The method as set forth in claim 16 wherein the step of filtering the polyether polyol is further defined as filtering the polyether polyol through the filter media under a pressure of 10 to 50 psig.

18. The method as set forth in claim 17 wherein the step of filtering the purified polyether polyol is continued for a period of time of from 1 to 5 hours to substantially remove the adsorbent and the non-volatile impurity.

19. The method as set forth in claim 15 further including the step of pre-filtering the crude polyether polyol through the filter media prior to contacting the crude polyether polyol with the adsorbent.

20. The method as set forth in claim 19 wherein the step of pre-filtering the crude polyether polyol is carried out under a pressure of 10 to 50 psig.

21. The method as set forth in claim 19 further including the step of filtering the purified polyether polyol and the adsorbent with adsorbed non-volatile impurity after contacting the crude polyether polyol with the adsorbent through the same filter media used to pre-filter the polyether polyol.

22. The method as set forth in claim 13 wherein the step of contacting the crude polyether polyol with the adsorbent is further defined as mixing the crude polyether polyol with the adsorbent.

23. The method as set forth in claim 22 wherein the step of mixing the crude polyether polyol and the adsorbent is carried out for a period of from 5 to 120 minutes.

24. The method as set forth in claim 13 wherein the step of providing the crude polyether polyol having the non-volatile impurity is further defined as providing the crude polyether polyol having polypropylene oxide present therein with a number-average molecular weight of at least 45,000 Daltons.

* * * * *